United States Patent [19]
Codrino

[11] 3,892,911
[45] July 1, 1975

[54] JUNCTION BOX FOR MOTOR VEHICLE ELECTRICAL SYSTEMS

[75] Inventor: Giuseppe Codrino, Quattordio, Italy

[73] Assignee: Cavis-Cavetti Isolati S.p.A., Felizzano (Alessandria), Italy

[22] Filed: July 30, 1974

[21] Appl. No.: 492,997

[30] Foreign Application Priority Data
Dec. 5, 1973 Italy................................. 53700/73

[52] U.S. Cl................................ 174/59; 220/3.94
[51] Int. Cl............................................ H02g 3/08
[58] Field of Search............... 174/59, 60, 52 R, 50; 220/3.92, 3.94, 4 R

[56] References Cited
UNITED STATES PATENTS

| | | | |
|---|---|---|---|
| 3,299,199 | 1/1967 | Mattingly.......................... | 174/59 X |
| 3,376,542 | 4/1968 | Vlaminck........................... | 174/60 |
| 3,477,609 | 11/1969 | Winkler, Jr...................... | 174/60 X |
| 3,617,612 | 11/1971 | Patton................................. | 174/59 |

*Primary Examiner*—J. V. Truhe
*Assistant Examiner*—David A. Tone
*Attorney, Agent, or Firm*—Sughrue, Rothwell, Mion, Zinn & Macpeak

[57] ABSTRACT

A junction box for a motor vehicle electrical system for coupling electrical leads extending to the rear of a vehicle with leads extending to the front of a vehicle, comprising a moulded body having various component parts, notably a tray member, one end wall and a bottom wall, constructed separately and carrying connector blocks for flat pin connector terminals; the connector blocks are interconnected internally to one another and to the tray member which houses the safety fuses of the circuits and various electromagnetic actuator devices, and which has a transparent lid.

3 Claims, 7 Drawing Figures

3,892,911

JUNCTION BOX FOR MOTOR VEHICLE ELECTRICAL SYSTEMS

BACKGROUND OF THE INVENTION

This invention relates to a junction box for motor vehicle electrical systems.

Motor vehicle electrical systems are of considerable complexity owing to the large number of elctrical appliances, instruments and control devices which must all be selectively operable and which are all supplied from a single source of electricity.

The complexity of such systems is also due to the fact that most of the operative component parts are spaced at various positions all over the motor vehicle, while the operating switches and the dials of the instruments have to be grouped together near the driving seat so as to be accessible to the driver.

Motor vehicle electrical systems thus require the installation of groups of leads of different sizes, these being positioned either individually or in multiple strips, to connect the source of electric current to the electrical appliances and control devices and to the relevant operating or control members of switches.

OBJECTS OF THE INVENTION

The main object of this invention is to simplify motor vehicle electrical systems by providing a junction box in which all the electrical connections of the system, as well as safety devices such as fuses, are grouped together.

Another object of the invention is to reduce the length of the wires of a motor vehicle electrical system.

A further object of this invention is to achieve a more rational distribution of the wiring within a vehicle.

Another important object of the invention is to provide a junction box which can be located between the instrument panel and the front compartment of the motor vehicle, so as to be able to join together leads both from the front and rear of the vehicle, and from the two sides of the vehicle.

Yet another important object of the invention is to provide a junction box which will allow ready access to all the connections therein and to the electrical components, including safety devices such as fuses housed therein, when repairs or checking are required.

SUMMARY OF THE INVENTION

According to the present invention a junction box for a motor vehicle electrical system comprises a hollow body having apertured lugs by means of which it is attachable to support elements of the bodywork of a vehicle, and comprising, with reference to a given orientation, a first end wall, two symmetrical side walls and a transverse bridging piece which connects two corresponding corners of the two side walls remote from the said first end wall and extends substantially parallel to the said first end wall; a second end wall, attachable to the body in a position parallel to the first end wall; a bottom wall the rim of which is housed in lower guideways in the side walls of the body so as to close the bottom of the body; a tray member housed in upper guideways in the side walls of the body and a transparent lid covering the top of the body and attachable to the tray member which, together with the bottom wall is held in place against withdrawal along the said guideways by the second end wall, the second end wall and the bottom wall being provided with electrical connector units having pins for connection to terminals of leads of a vehicle's electrical system, the connector units being interconnected with each other within the junction box and being connectable to actuating members and safety fuses housed in the said tray member.

The advantages of this construction lie in the fact that all the electrical connections can be made to the pins on the second end wall and on the bottom wall of the junction box thereby simplifying the connections of a wiring circuit. The transparent lid to the tray member also offers another advantage in permitting the components housed therein to be visually inspected without reequiring any dismantling.

Various other features and advantages of the invention will become apparent during the course of the following description with reference to the accompanying drawings, which are provided purely by way of non-restrictive example.

DESCRIPTION OF THE PREFERRED EMBODIMENTS

Figure 1:
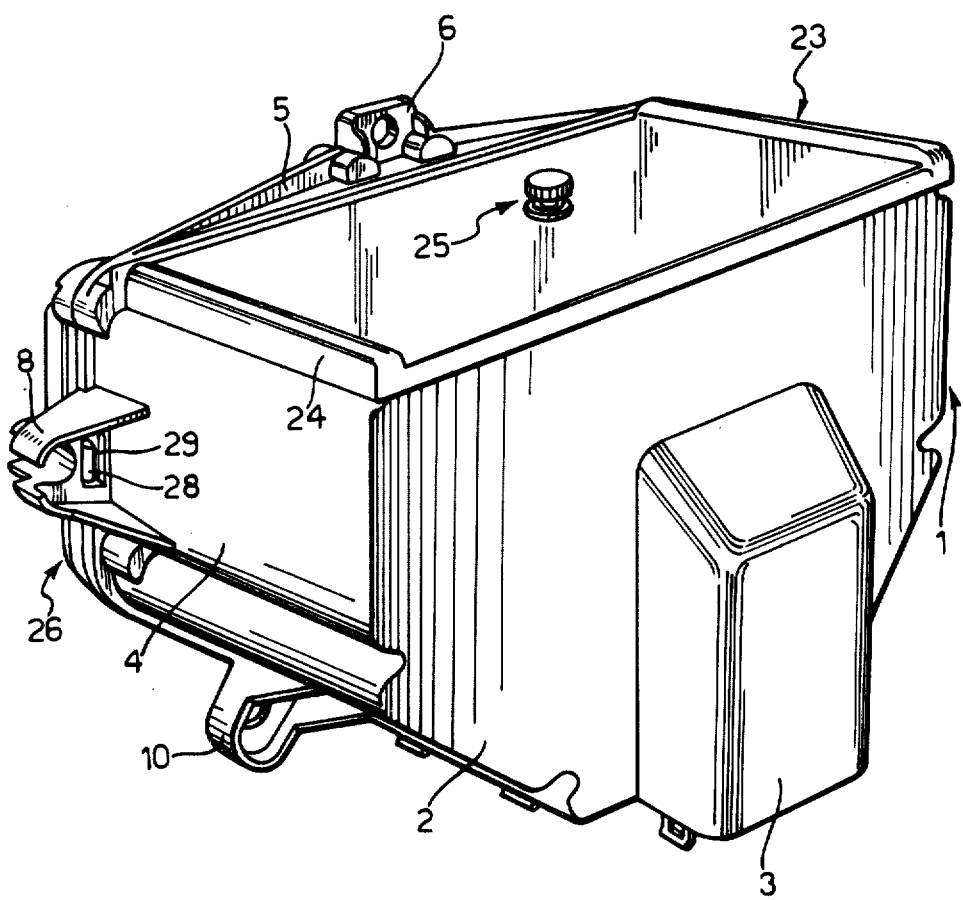
FIG. 1 is a perspective view of a junction box formed as an embodiment of the invention, shown assembled and closed.
Figure 2:
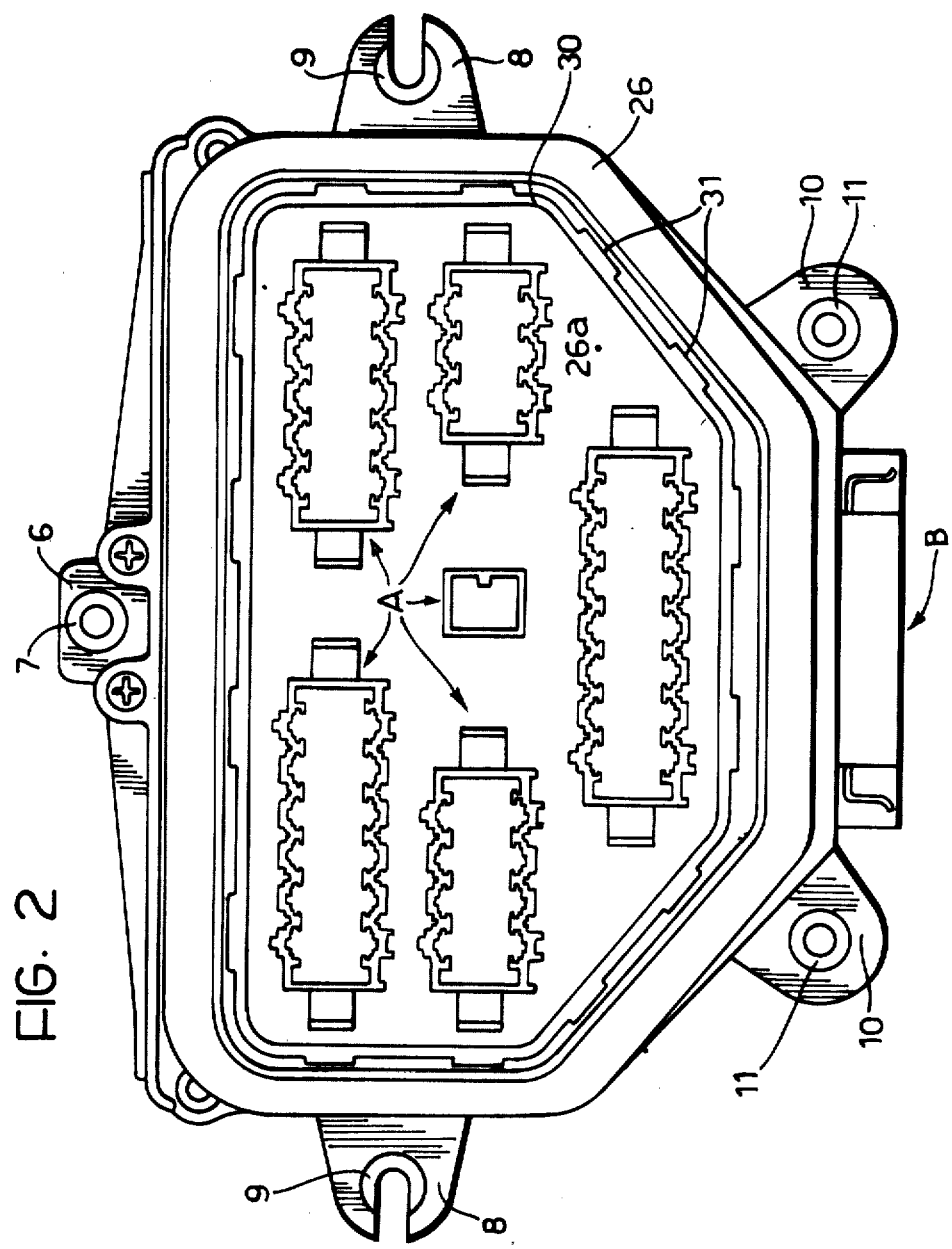
FIG. 2 is a front view of the embodiment with the front wall removed.
Figure 3:
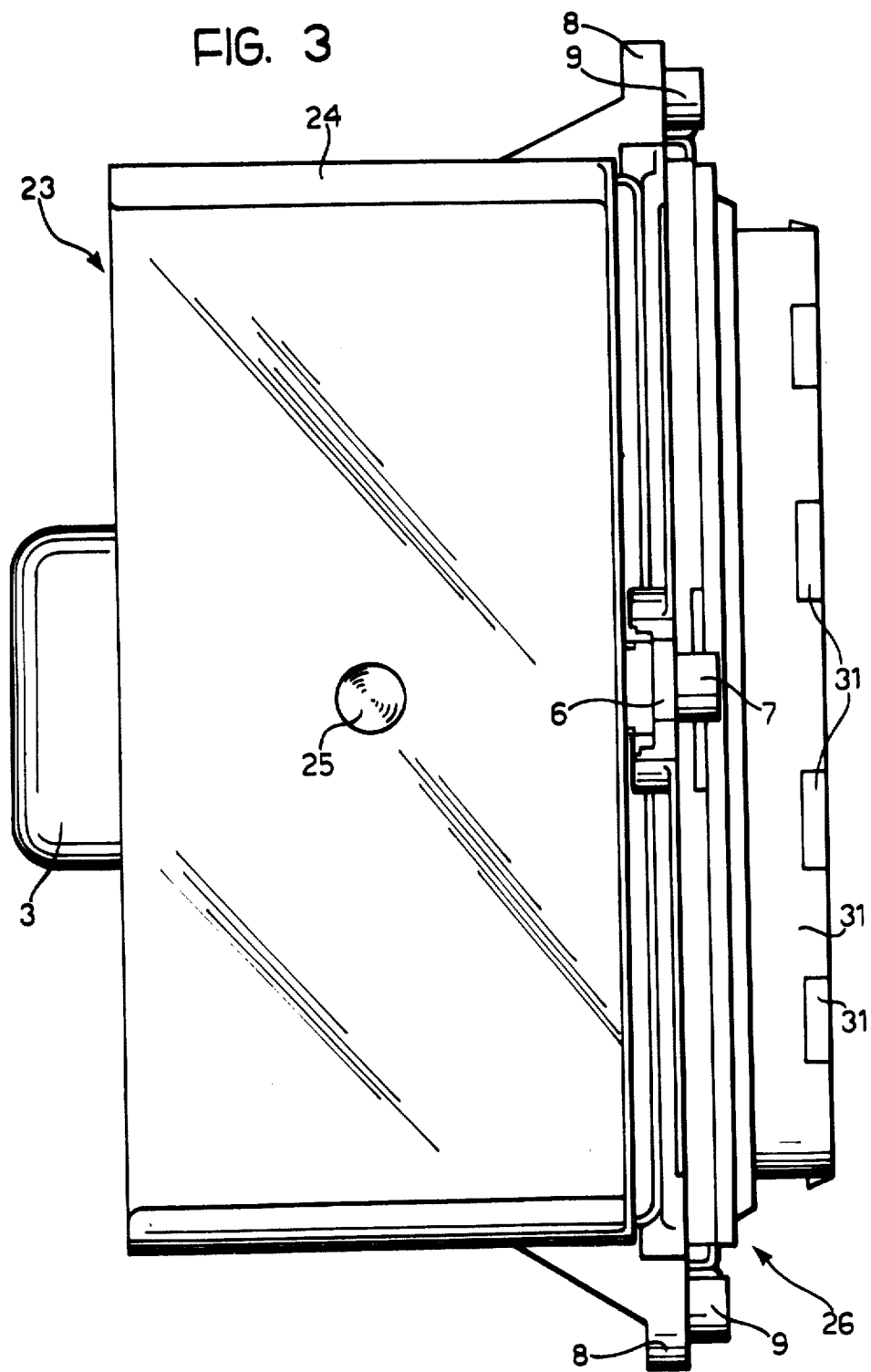
FIG. 3 is a plan view of the embodiment from above.
Figure 4:
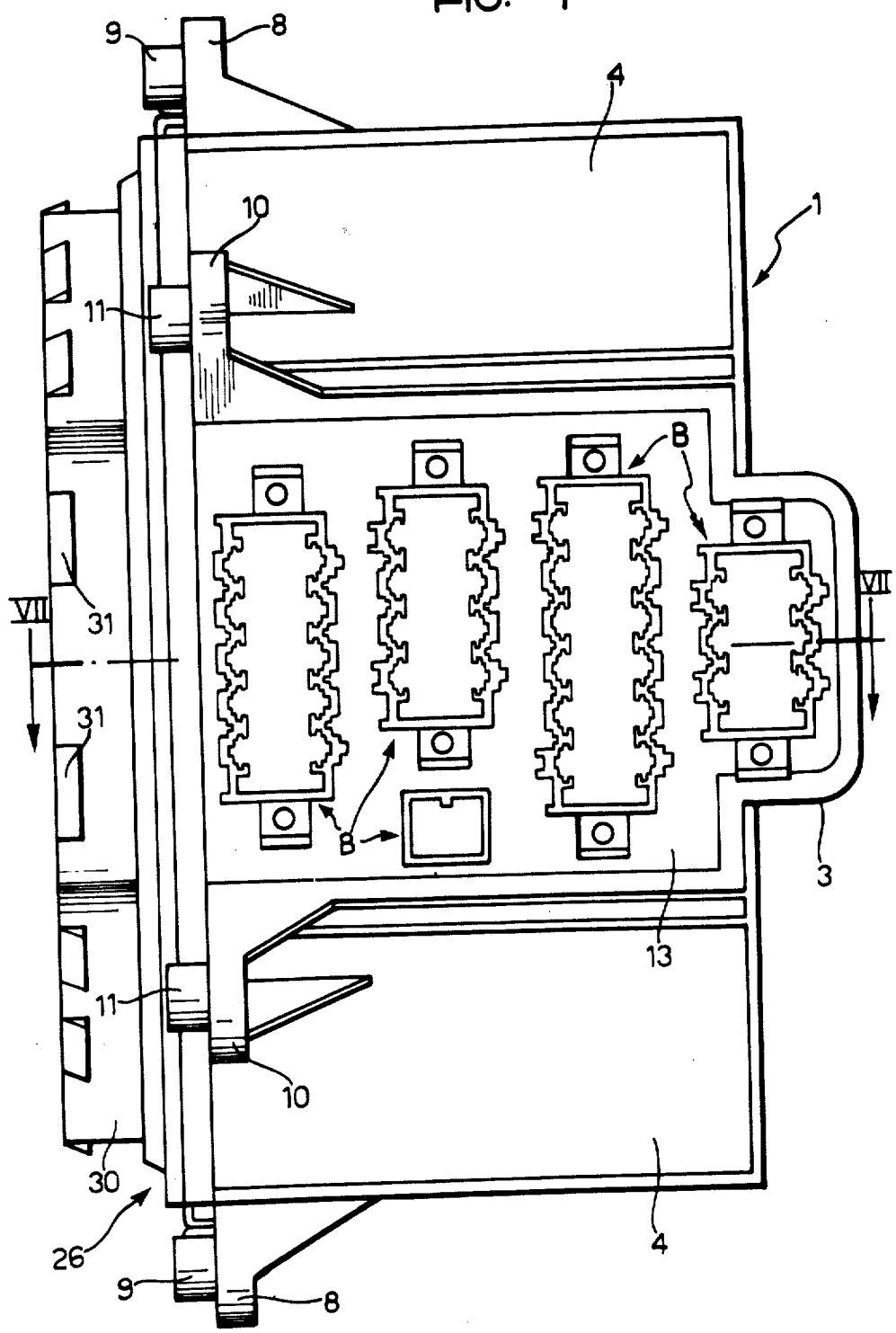
FIG. 4 is an under plan view of the embodiment.
Figure 5:
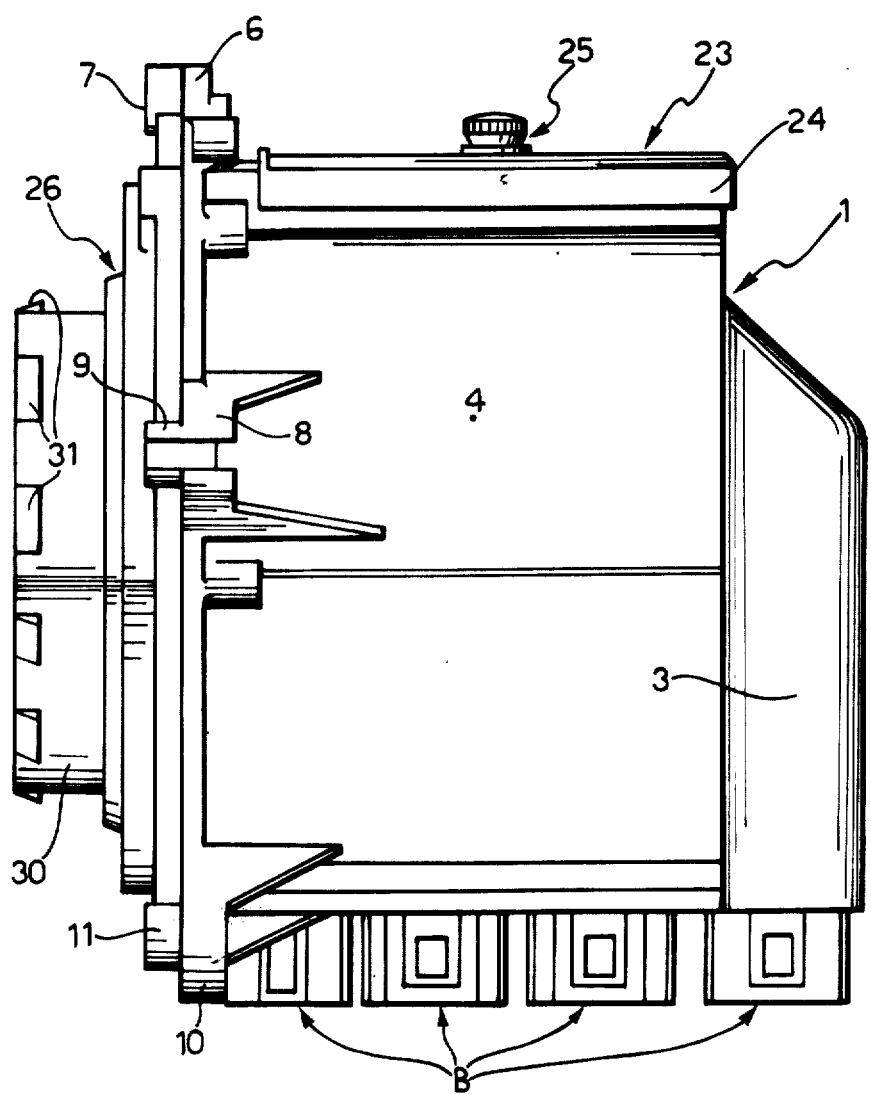
FIG. 5 is a side view of the embodiment.
Figure 6:
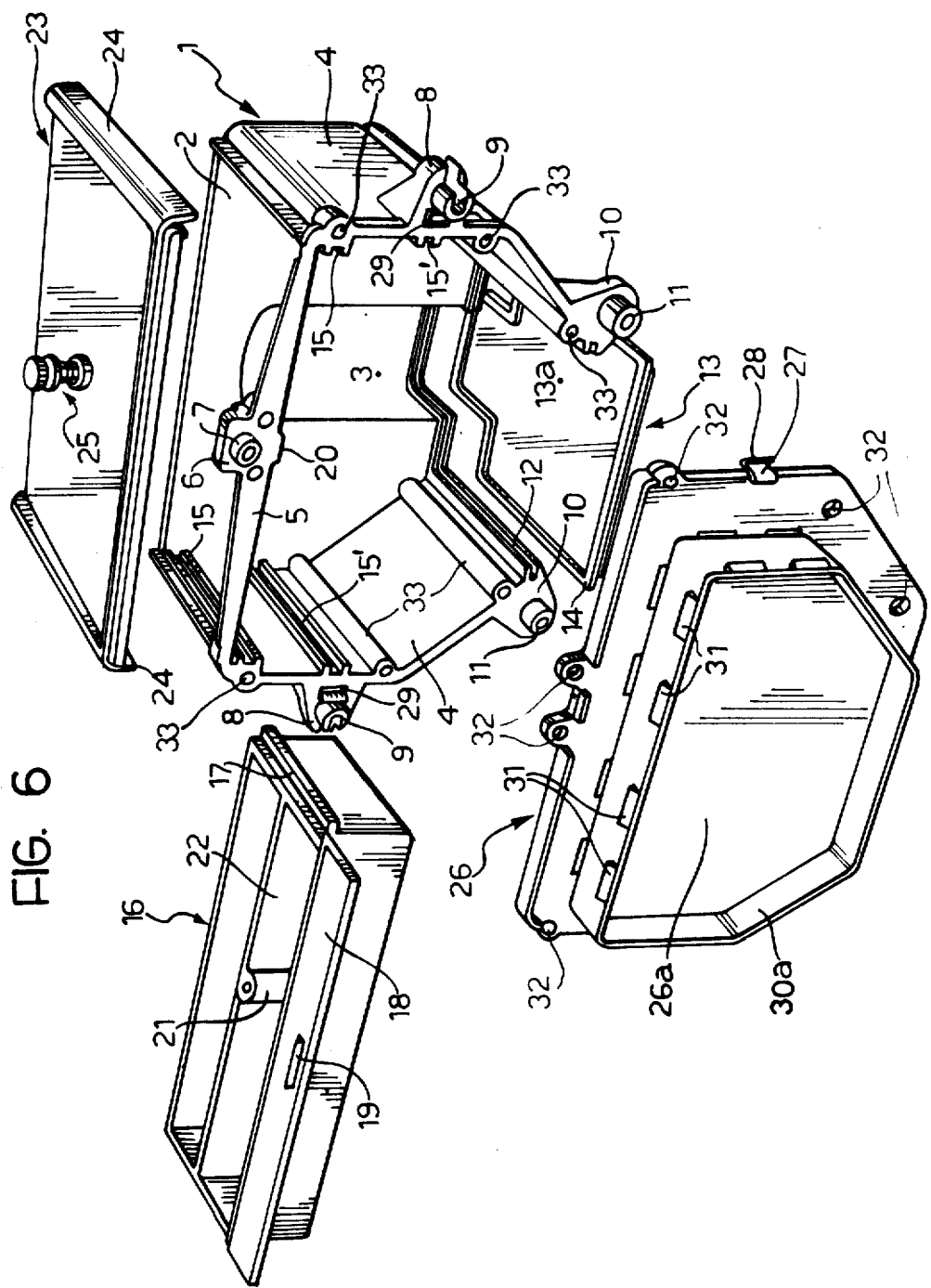
FIG. 6 is an exploded perspective view of the embodiment.
Figure 7:
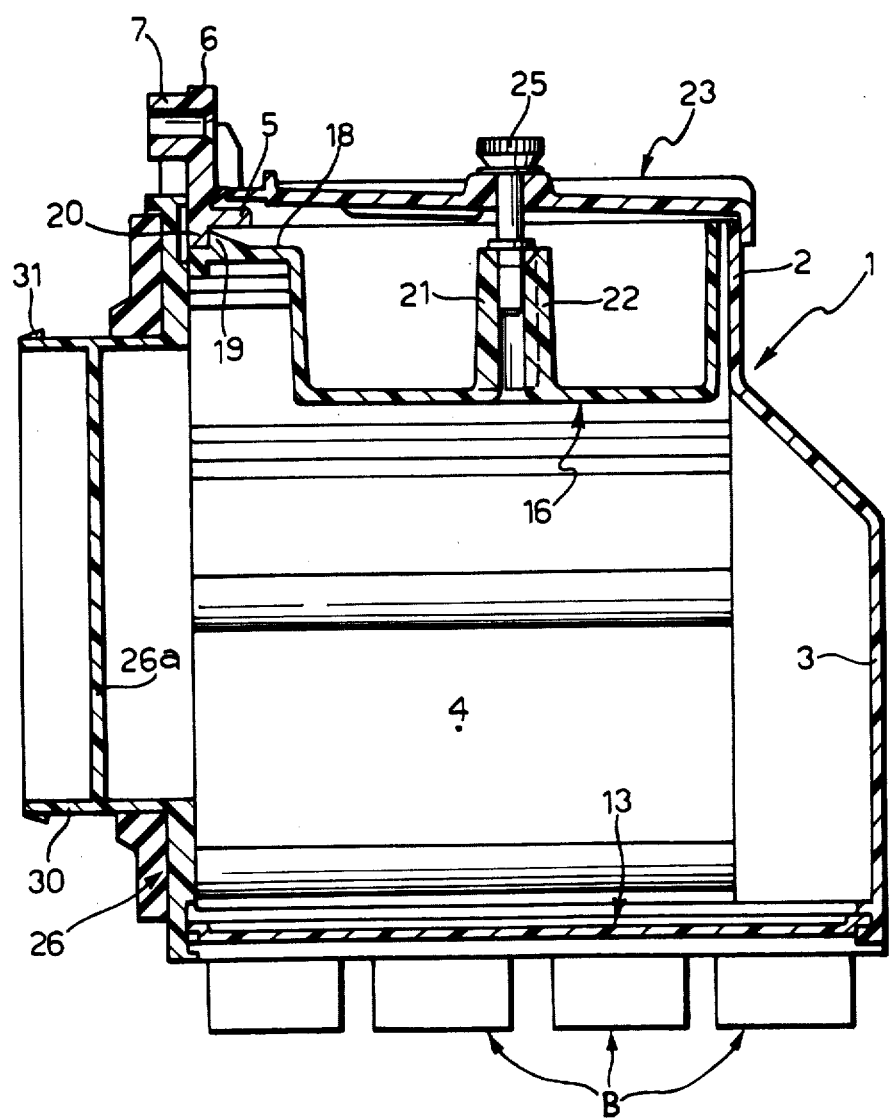
FIG. 7 is a cross-section of the embodiment, taken along the line VII—VII of FIG. 4.

Referring now to the drawings the junction box shown comprises a main body 1, preferably moulded from a plastics material, and has a rear wall 2 which, when the junction box is in its normal upright orientation, is substantially vertical, the rear wall 2 has at its centre a shaped protuberance 3 which extends rearwardly. The main body also includes two symmetrical side walls 4 shaped so as to converge towards the bottom of the junction box, and an upper transverse bridging piece 5, parallel to the rear wall 2 and extending between the front upper corners of the two side walls 4. From the middle of the transverse bridging piece 5 projects an upstanding lug 6 having a hollow tubular stud 7; there are similar projecting lugs 8, 10, having similar small hollow studs 9, 11, projecting perpendicularly from the side walls to allow fixing of the box on to a supporting part of the bodywork of the vehicle, such as, for example, the forward bulkhead separating the passenger compartment from the forward compartment. It is envisaged that the junction box would be mounted on the rear face of the forward bulkhead to make connections with leads extending therethrough.

Along the lower edges of the side walls 4 there are arranged horizontal guides 12 into which fits a bottom wall insert 13 shaped to close the bottom of the box, including the protuberance 3. The bottom wall comprises a flat panel 13a with a surrounding projecting rim 14 which is forcibly inserted into the guides 12.

At the top of the inside of the body 1, there are two further pairs of parallel guides 15, 15' extending horizontally along the inner faces of the side walls 4. Into the two upper guides 15 there is inserted a tray 16 having lateral ridges 17 which engage into the guides 15 and, at the front, a horizontal projecting flange 18, provided at the centre with a tooth 19 which snap engages a stop 20 carried on the centre of the brridging crosspiece 5. The tray 16, when it is inserted into the body 1 forms an upper wall of a lower chamber thereof. The tray is longitudinally sub-divided into two elongate recesses by a vertical transverse partition 22 at the centre of which there is arranged a tubular boss 21.

The top of the body 1 is covered by a lid 23 of transparent material having transverse lips 24 at the side edges, which engage the upper edges of the sides of the box. At the centre of the lid 23 there is a captive screw 25 which screws into the tubular boss 21 of the drawer to secure the lid in position. The fact that the lid 23 is transparent makes it possible to see the components normally in the two parallel recesses of the tray 16; normally in these recesses there would be arranged members which actuate the electric circuits and a set of safety fuses connected into the various circuits. The screw 25 has an enlarged head with a knurled or milled finger grip allowing ready removal of this lid for access to the two recesses in the tray 16 for any necessary repairs or tests.

Parallel to the rear wall 2 of the body 1 there is a front wall 26, having spring clips 27 at the sides thereof terminating in symmetrical teeth 28 which snap engage into recesses 29 formed in the lugs 8 of the body. The front wall 26 is also affixed to the body by means of screws passing through peripheral holes 32 in the wall 26 and locating in threaded tubular bosses 33 in the side walls 4 of the main body 1. The front wall 26 locks both the upper tray 16 and the bottom wall 13 into position on the main body 1.

From the front face of the front wall 26 there projects a continuous closed annular flange 30, which is spaced within but follows the outline of the wall 26. Around the rim of the flange there are a plurality of teeth 31 of triangular cross-section. For mounting the junction box on a bulkhead it is envisaged that a suitable hole having the same shape as the flange 30 will be formed through the bulkhead for the flange 30 to fit into when mounted. The teeth 31 will snap engage the rim of the hole to hold the box in place pending the fixing of screws through the holes in the hollow studs 7, 9, 11 on the lugs 6, 8, 10. The flange 30 surrounds a central part 26a of the wall 26 and on this central part there are carried a plurality of connector blocks A of the flat pin type. The central part 13a of the bottom wall 13 is likewise provided with a plurality of connector units B, of the same type, which, like the units A facilitate connection of the relative elctric leads. When connected to the forward bulkhead of a vehicle, as described above, the connector units of the front wall 26 allow connection of the box to the leads which are connected to components in the forward compartment of the vehicle, while the connector units B in the bottom wall 13 allow connection with the leads which go to the passenger compartment or to the rear of the vehicle. The two sets of connector units are interconnected with each other within the junction box and are connected, where requiired, to the operating members, such as remote control switches, electromagnets and the like, as well as the safety fuses which are connected in the vehicle's electrical circuits and which are housed in the tray 16.

The different parts of the box can be assembled separately and then be connected together in accordance with predetermined criteria. The box allows easy access to any component within it for any necessary repairs or replacements.

When positioned as described above, the junction box also fulfils the function of connecting the electric leads between the forward compartment and the passenger compartment of the vehicle.

I claim:

1. A junction box for a motor vehicle electrical system, comprising:
   a hollow unitary main body incorporating, with reference to a give orientation:
      a first end wall,
      two symmetrical side walls each connected along a first edge to a respective opposite edge of said end wall,
      a transverse bridging member interconnecting corresponding corners of said side walls at a second edge thereof, opposite said first edge,
      means defining upper and lower aligned guideways in each said side wall, said guideways extending between said first and second edges,
      a plurality of apertured lugs on said body, said apertured lugs forming means by which said body is attachable to support elements of the bodywork of a motor vehicle,
   a member forming a bottom wall having a rim slidably inserted into said lower guideways in said side walls closing the bottom of said unitary body,
   a tray member having two parallel side edges slidably inserted into said upper guideways in said side walls of said unitary body,
   a transparent lid member removably attached to said tray member,
   a member forming second end wall attached to said body along the edges of said two side walls opposite the edges connected to said first end wall so as to extend substantially parallel to said first end wall, said second end wall overlying the edges of said bottom wall member and said tray member to hold these in position against withdrawal along said upper and lower guideways,
   first and second electrical connector units respectively mounted on said second end wall member and said bottom wall member, said connector units having pins for connection to terminals on the leads of a motor vehicle electrical system,
   means electrically connecting said first and second electrical connector units together, and
   means connecting said electrical connector units to said tray member for electrical connection to any electrical components and safety fuses which may be housed in said tray member.

2. The junction box of claim 1 wherein said second end wall is provided with spring clips having teeth thereon,
   recesses in said side walls of said main body, said teeth of said spring clips engaging in said recesses in said side walls.

3. The junction box of claim 1 wherein said second end wall has a closed annular flange projecting transverse the plane thereof and spaced inwardly from the edges thereof, and
   a plurality of radially outwardly directed teeth on said flange, whereby said junction box can be supported in a mounting hole in a supporting part of the bodywork of a vehicle by snap engagement of said teeth therewith, prior to insertion of securing screws or bolts through the apertures in said mounting lugs of said main body portion.

* * * * *